(12) United States Patent  
Queen

(10) Patent No.: US 11,574,475 B2
(45) Date of Patent: Feb. 7, 2023

(54) SYSTEMS AND METHODS FOR IMPROVED OPERATIONS OF SKI LIFTS

(71) Applicant: Clone667, LLC, Fort Collins, CO (US)

(72) Inventor: Bryan Scott Queen, Fort Collins, CO (US)

(73) Assignee: Clone667, LLC, Fort Collins, CO (US)

(*) Notice: Subject to any disclaimer, the term of this patent is extended or adjusted under 35 U.S.C. 154(b) by 185 days.

(21) Appl. No.: 17/184,404

(22) Filed: Feb. 24, 2021

(65) Prior Publication Data

US 2021/0182561 A1    Jun. 17, 2021

Related U.S. Application Data

(63) Continuation of application No. 16/514,696, filed on Jul. 17, 2019, now Pat. No. 10,946,882.

(51) Int. Cl.
*G06V 20/40* (2022.01)
*G06K 9/62* (2022.01)
(Continued)

(52) U.S. Cl.
CPC ........... *G06V 20/42* (2022.01); *B61B 7/00* (2013.01); *B61B 11/00* (2013.01); *B61B 12/00* (2013.01);
(Continued)

(58) Field of Classification Search
CPC ........... G06K 9/00724; G06K 9/00369; G06K 9/00758; G06K 9/00771; G06K 9/6256;
(Continued)

(56) References Cited

U.S. PATENT DOCUMENTS

| 3,868,907 A | 3/1975 | Schippers |
| 5,528,219 A | 6/1996 | Frohlich et al. |

(Continued)

FOREIGN PATENT DOCUMENTS

| AT | 414056 B | 8/2006 |
| FR | 2999513 A1 | 6/2014 |
| WO | 2012/172198 A1 | 12/2012 |

OTHER PUBLICATIONS

International Search Report and Written Opinion, dated Sep. 30, 2020, for International Application No. PCT/US2020/039175, 15 pages.
(Continued)

*Primary Examiner* — Mark Roz
(74) *Attorney, Agent, or Firm* — Jeremiah J. Baunach; VLP Law Group LLP

(57) ABSTRACT

Systems and methods for improved operations of ski lifts increase skier safety at on-boarding and off-boarding locations by providing an always-on, always-alert system that "watches" these locations, identifies developing problem situations, and initiates mitigation actions. One or more video cameras feed live video to a video processing module. The video processing module feeds resulting sequences of images to an artificial intelligence (AI) engine. The AI engine makes an inference regarding existence of a potential problem situation based on the sequence of images. This inference is fed to an inference processing module, which determines if the inference processing module should send an alert or interact with the lift motor controller to slow or stop the lift.

28 Claims, 8 Drawing Sheets

(51) Int. Cl.
*G08B 7/06* (2006.01)
*B61B 11/00* (2006.01)
*B61B 12/00* (2006.01)
*B61B 7/00* (2006.01)
*B61L 27/04* (2006.01)
*G05B 13/02* (2006.01)
*G06V 20/52* (2022.01)
*G06V 40/10* (2022.01)
*B61L 27/57* (2022.01)
*G08B 21/02* (2006.01)

(52) U.S. Cl.
CPC .............. *B61L 27/04* (2013.01); *B61L 27/57* (2022.01); *G05B 13/0265* (2013.01); *G06K 9/6256* (2013.01); *G06V 20/40* (2022.01); *G06V 20/48* (2022.01); *G06V 20/52* (2022.01); *G06V 40/103* (2022.01); *G08B 7/06* (2013.01); *G06V 20/44* (2022.01); *G08B 21/02* (2013.01)

(58) Field of Classification Search
CPC .......... G06K 2009/00738; B61B 11/00; B61B 12/00; G08B 7/06; G08B 21/02
See application file for complete search history.

(56) References Cited

U.S. PATENT DOCUMENTS

| | | |
|---|---|---|
| 6,628,819 B1 | 9/2003 | Huang et al. |
| 10,414,418 B2 | 9/2019 | Martin |
| 2017/0308753 A1 | 10/2017 | Wu et al. |

OTHER PUBLICATIONS

Bascol et al., "Improving Chairlift Security with Deep Learning," https://hal.archives-ouvertes.fr/hal-01581382, 2017, 13 pages.
International Search Report and Written Opinion of PCT/US2020/039175, dated Sep. 30, 2020, 15 pages.

SYSTEMS AND METHODS FOR IMPROVED OPERATIONS OF SKI LIFTS

TECHNICAL FIELD

The technical field relates to ski lifts, and particularly to improving operations of ski lifts.

BRIEF SUMMARY

Systems and methods for improved operations of ski lifts increase skier safety at on-boarding and off-boarding locations by providing an always-on, always-alert system that "watches" these locations, identifies developing problem situations, and initiates mitigation actions. One or more video cameras feed live video to a video processing module. The video processing module feeds resulting sequences of images to an artificial intelligence (AI) engine. The AI engine makes an inference regarding existence of a potential problem situation based on the sequence of images. This inference is fed to an inference processing module, which determines if the inference processing module should send an alert or interact with the lift motor controller to slow or stop the lift.

A computerized method for improved ski lift operations may be summarized as including capturing, by at least one computer processor, digital video of one or more of on-boarding and off-boarding operations of a ski lift; generating, by at least one computer processor, as the ski lift is operating, a plurality of digital images of the one or more of on-boarding and off-boarding operations of the ski lift based on the captured digital video; automatically detecting, by at least one computer processor, in real-time as the digital video is being captured, as the ski lift is operating, a potential problem situation in one or more of an on-boarding area and an off-boarding area of the ski lift based on the plurality of digital images; and initiating an action, by the at least one computer processor, as the ski lift is operating, to address the potential problem situation in the one or more of the on-boarding area and off-boarding area of the ski lift while the potential problem situation still exists.

The method may further include analyzing, by at least one computer processor, the plurality of digital images as the ski lift is operating, wherein the automatically detecting the potential problem situation is based on the analysis of the plurality of digital images. The analyzing the plurality of digital images as the ski lift is operating, may include recognizing in the plurality of digital images a sequence of events that represents an abnormal on-boarding or off-boarding process at a scene of the ski lift that includes the one or more of the on-boarding area and an off-boarding area of the ski lift. The sequence of events that represents an abnormal on-boarding or off-boarding process may include one or more of a lift rider falling while on-boarding the ski lift; a lift rider falling while off-boarding the ski lift; a lift rider lying or sitting the ground in a lift chair loading zone; a lift rider being dragged by a ski lift chair; a ski pole or other equipment of a lift rider being caught in a ski lift chair; a lift rider proceeding to on-board the ski lift late; a lift rider failing to exit off-boarding area; a lift rider being in an abnormal position on a lift chair after on-boarding the ski lift; a lift rider starting to slip off a lift chair after on-boarding the ski lift; a lift rider leaving a lift chair loading zone as a lift chair is approaching the lift rider; a lift rider under a pre-determined size in a lift chair loading zone as a lift chair is approaching the lift rider; a number of lift riders being in a lift chair loading zone that is over a pre-determined limit of lift riders for a lift chair; a lift rider facing a wrong direction in a lift chair loading zone as the lift chair is approaching the lift rider; a lift rider being in an incorrect position within a lift chair loading zone as the lift chair is approaching the lift rider; an incorrect number of lift riders off-boarding a lift chair compared to a number of lift riders that on-boarded the lift chair; an incorrect number of lift riders on a lift chair compared to a number of lift riders that were in a lift chair loading zone for the lift chair when the lift chair arrived for on-boarding; a mechanical problem with a lift chair of the ski lift; a mechanical problem with operation of the ski lift; and a problem with a structural element of the ski lift. The analyzing the plurality of digital images as the ski lift is operating may include analyzing the plurality of digital images using an artificial intelligence engine trained to assess sequences of digital images and identify normal and potential problem situations taking place in a scene of the ski lift that includes the one or more of the on-boarding area and an off-boarding area of the ski lift.

The method may further include training the artificial intelligence engine, using sequences of training images of one or more of on-boarding and off-boarding operations of one or more ski lifts, to assess the sequences of digital images and identify normal and potential problem situations taking place in the scene. Initiating the action to address the potential problem situation in the one or more of the on-boarding and off-boarding area of the ski lift while the potential problem situation still exists may include comparing the detected potential problem situation to a plurality of potential problem situations to determine a match of the detected potential problem situation to a matching one of the plurality of potential problem situations; selecting an action to initiate according to a rule associated with the matching one of the plurality of potential problem situations; and initiating the selected action to address the potential problem situation in the one or more of the on-boarding and off-boarding area of the ski lift while the potential problem situation still exists. The initiating the action to address the potential problem situation in the one or more of the on-boarding and off-boarding area of the ski lift while the potential problem situation still exists may include initiating electronic sending of a signal to a motor controller of the ski lift to slow down or stop operation of the ski lift to address the potential problem situation in the one or more of the on-boarding and off-boarding area of the ski lift. The initiating the action to address the potential problem situation in the one or more of the on-boarding and off-boarding area of the ski lift while the potential problem situation still exists may include initiating of electronic sending of an alert for a ski lift attendant. The sending the alert for the ski lift attendant may include one or more of sending an audio alert, sending a message-based alert and sending a light-based alert.

A system for improved operations of ski lifts may be summarized as including at least one memory; and at least one processor coupled to the at least one memory, wherein the at least one memory has computer-executable instructions stored thereon that, when executed, cause the at least one processor to capture digital video of one or more of on-boarding and off-boarding operations of a ski lift; generate, as the ski lift is operating, a plurality of digital images of the one or more of on-boarding and off-boarding operations of the ski lift based on the captured digital video; automatically detect, as the ski lift is operating, a potential problem situation in one or more of the on-boarding and off-boarding area of the ski lift based on the plurality of digital images; and initiate an action, as the ski lift is operating, to address the potential problem situation in the one or more of the on-boarding and off-boarding area of the ski lift while the potential problem situation still exists.

The computer-executable instructions, when executed, may further cause the at least one processor to analyze the plurality of digital images as the ski lift is operating, wherein the automatic detection of the potential problem situation is based on the analysis of the plurality of digital images. The computer-executable instructions, when executed, may further cause the at least one processor to recognize in the plurality of digital images a sequence of events that represents an abnormal on-boarding or off-boarding process at a scene of the ski lift that includes the one or more of the on-boarding area and an off-boarding area of the ski lift. The analyzing the plurality of digital images as the ski lift is operating may include analyzing the plurality of digital images using an artificial intelligence engine trained to assess sequences of digital images and identify normal and potential problem situations taking place in a scene of the ski lift that includes the one or more of the on-boarding area and an off-boarding area of the ski lift.

A ski lift controller may be summarized as including a ski lift motor controller of a ski lift; at least one memory; at least one video camera; and at least one processor coupled to the at least one memory, the at least one camera and the ski lift motor controller, wherein the at least one memory has computer-executable instructions stored thereon that, when executed, cause the at least one processor to capture, via the at least one video camera, digital video of one or more of on-boarding and off-boarding operations of the ski lift; generate, as the ski lift is operating, a plurality of digital images of the one or more of on-boarding and off-boarding operations of the ski lift based on the captured digital video; automatically detect, as the ski lift is operating, a potential problem situation in one or more of the on-boarding and off-boarding area of the ski lift based on the plurality of digital images; and initiate an action, as the ski lift is operating, to address the potential problem situation in the one or more of the on-boarding and off-boarding area of the ski lift while the potential problem situation still exists.

The computer-executable instructions, when executed, may further cause the at least one processor to analyze the plurality of digital images as the ski lift is operating, wherein the automatic detection of the potential problem situation is based on the analysis of the plurality of digital images. The computer-executable instructions, when executed, may further cause the at least one processor to recognize in the plurality of digital images a sequence of events that represents an abnormal on-boarding or off-boarding process at a scene of the ski lift that includes the one or more of the on-boarding area and an off-boarding area of the ski lift. The analysis of the plurality of digital images as the ski lift is operating may include analysis of the plurality of digital images using an artificial intelligence engine trained to assess sequences of digital images and identify normal and potential problem situations taking place in a scene of the ski lift that includes the one or more of the on-boarding area and an off-boarding area of the ski lift.

A non-transitory computer-readable storage medium, having computer executable instructions stored thereon that, when executed by the at least one processor, may be summarized as causing the at least one processor to automatically detect, as a ski lift is operating, a potential problem situation in one or more of an on-boarding and off-boarding area of the ski lift based on a plurality of digital images from captured digital video of operation of the ski lift; and initiate an action, as the ski lift is operating, to address the potential problem situation in the one or more of the on-boarding and off-boarding area of the ski lift while the potential problem situation still exists.

The computer executable instructions, when executed, may further cause the at least one processor to capture digital video of the one or more of on-boarding and off-boarding operations of a ski lift; and generate, as the ski lift is operating, the plurality of digital images of the one or more of on-boarding and off-boarding operations of the ski lift based on the captured digital video. The computer executable instructions, when executed, may further cause the at least one processor to analyze the plurality of digital images as the ski lift is operating, wherein the automatic detection of the potential problem situation is based on the analysis of the plurality of digital images.

BRIEF DESCRIPTION OF THE DRAWINGS

The components in the drawings are not necessarily to scale relative to each other. Like reference numerals designate corresponding parts throughout the several views.

DETAILED DESCRIPTION

At a ski area, ski lift on-boarding and off-boarding locations are higher-risk areas due to the concentration of skiers and the mechanical nature of the lift. The types of problems that can occur in these locations include, but are not limited to: falls, which can result in injury to the falling skier as well as create an obstacle for other the next set of skiers on- or off-boarding the lift; people failing to get off of the lift where it is safe to do so and being carried beyond the safe off-boarding zone; people being dragged by the lift; people not clearing the off-boarding areas and consequently being struck by a moving lift chair; and people failing to successfully load, resulting in a scenario where they try to hang on to the lift, resulting in increasing danger as the chair rises higher and higher above the ground.

Most, if not all, ski lifts have one or more humans attending these on boarding and off-boarding areas and generally these attendants will respond to such problems described above, typically by slowing or stopping the ski lift. However, the attendants are not always alert or aware of developing situations, and they can be out of position to take action quickly if necessary.

Thus, the systems and methods disclosed herein improve operations of ski lifts by increasing skier safety at on-boarding and off-boarding locations by providing an always-on, always-alert system that "watches" these locations, identifies developing problem situations, and initiates mitigation actions when necessary. The systems and methods disclosed herein may serve either as a backup or primary monitoring system, capable of taking action if needed, reducing the dependence on human observation and freeing the humans to help skiers get back on their feet and out of the way.

Figure 1:
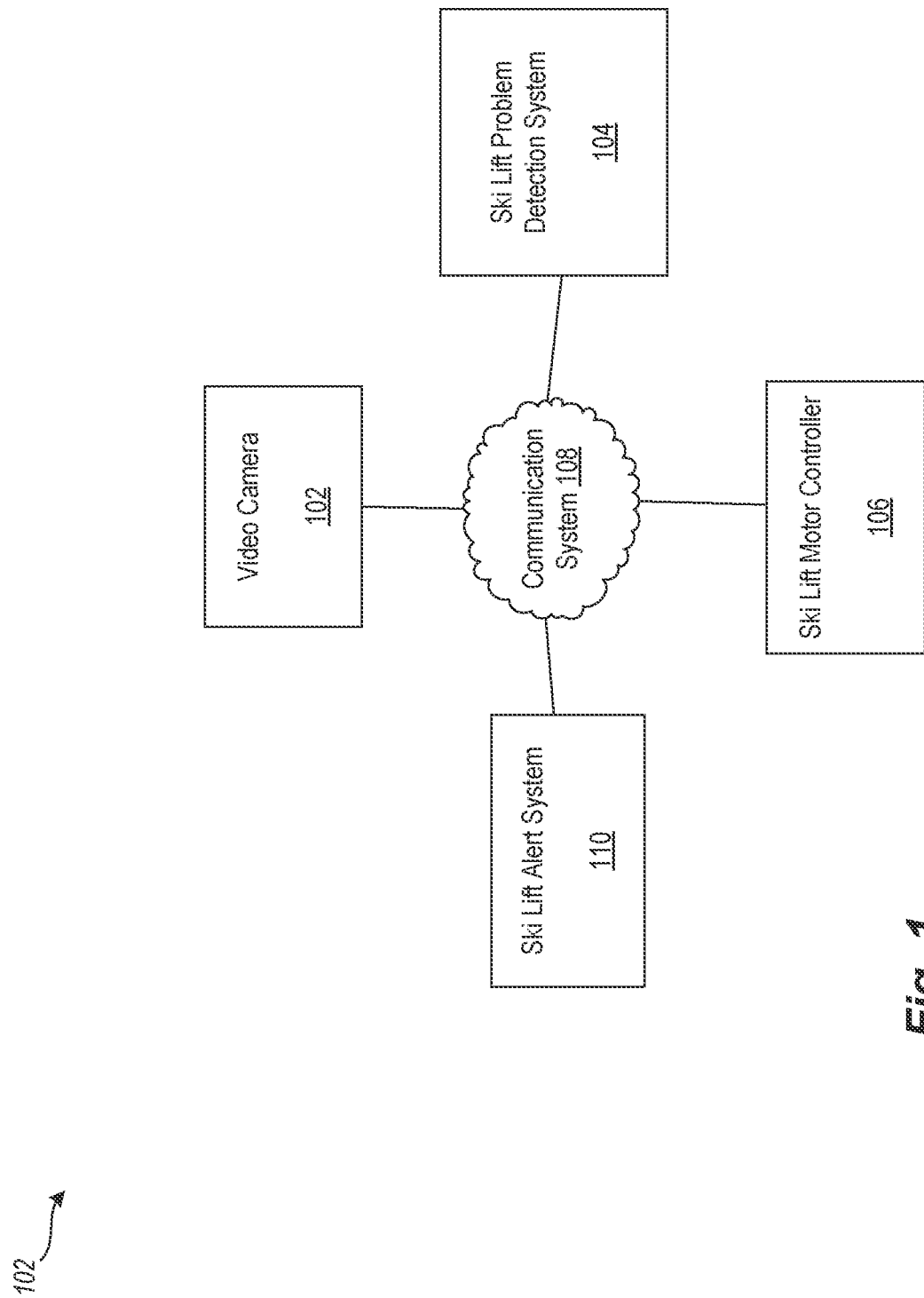
FIG. 1 is an overview block diagram illustrating an example technological environment in which embodiments of systems and methods for improved operations of ski lifts may be implemented, according to one example embodiment.

FIG. 1 is an overview block diagram illustrating an example technological environment 102 in which embodiments of systems and methods for improved operations of ski lifts may be implemented, according to one example embodiment. Before providing additional details regarding the operation and constitution of systems and methods for improved operations of ski lifts, the example technological environment 102, within which such systems and methods may operate, will briefly be described.

In the technological environment 102, in various example embodiments, the ski lift problem detection system 104 interconnects to at least one video camera 102, at least one ski lift motor controller 106 and at least one ski lift alert system 110. The ski lift problem detection system 104 may also interconnect with one or more mobile devices (e.g., smartphones, tablet devices, other computing devices, etc.) or remote devices or systems. The ski lift problem detection system 104 may send and receive data regarding the monitoring of the ski lift, including, but not limited to, video, images, audio, notification and alert data, analytics, results of image analyses, user interfaces and related data, measurements, detected states the ski lift and lift riders are in, artificial intelligence and machine learning models, sets of training data and verification data regarding machine learning. For example, the various data may be delivered using the Internet protocol (IP) suite over a packet-switched network such as the Internet or other packet-switched network or a peer-to-peer network, such as a Bluetooth® network. The underlying connection carrying such data may be or include wireless system operating according to the IEEE 802.11x standards (Wi-Fi system), wireless local area networking (WLAN) system, cable head-end, satellite antenna, telephone company switch, cellular telephone system, short range radio channel, Ethernet portal, off-air antenna, or the like. The ski lift problem detection system 104 may receive a plurality of video or image data from the video camera 102, and may also receive data from other sources, mobile devices and/or remote servers. This data may be received or formatted by the ski lift problem detection system 104 in various different formats.

Accordingly, the ski lift problem detection system 104 may be a device or electronic equipment that is operable to receive and process images, video and/or audio of the ski lift operations and process and communicate data regarding the images, video and/or audio as described herein. Further, the ski lift problem detection system 104 may itself include user interface devices, such as one or more displays and virtual or physical buttons or switches.

Data may be communicated between the ski lift problem detection system 104, the video camera 102, the ski lift alert system 110 and the ski lift motor controller through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, Wi-Fi systems, WLAN systems, short range wireless (e.g., Bluetooth®) systems, peer-to-peer network systems, hardwired systems, communication busses, computer network cabling, wide area network (WAN) systems, the Internet, cable systems, telephone systems, fiber optic systems, microwave systems, asynchronous transfer mode ("ATM") systems, frame relay systems, digital subscriber line ("DSL") systems, radio frequency ("RF") systems, cellular systems, and satellite systems.

The above description of the technological environment 102 and the various devices therein, is intended as a broad, non-limiting overview of an example environment in which various embodiments of improved operations of ski lifts may be implemented. FIG. 1 illustrates just one example of a technological environment 102 and the various embodiments discussed herein are not limited to such environments. In particular, technological environment 102 and the various devices therein, may contain other devices, systems and/or media not specifically described herein. For example, the techniques and devices described herein may be applicable in other to detect and address problem situations in other environments, such as, for example, in amusement rides, mass transit, road traffic, and other on-boarding and off-boarding environments.

Example embodiments described herein provide applications, tools, data structures and other support to implement improved operations of ski lifts. Other embodiments of the described techniques may be used for other purposes, including transmitting data to various distribution equipment, computers, peripherals, mobile devices, and other electronic devices, etc., for further processing and analysis. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
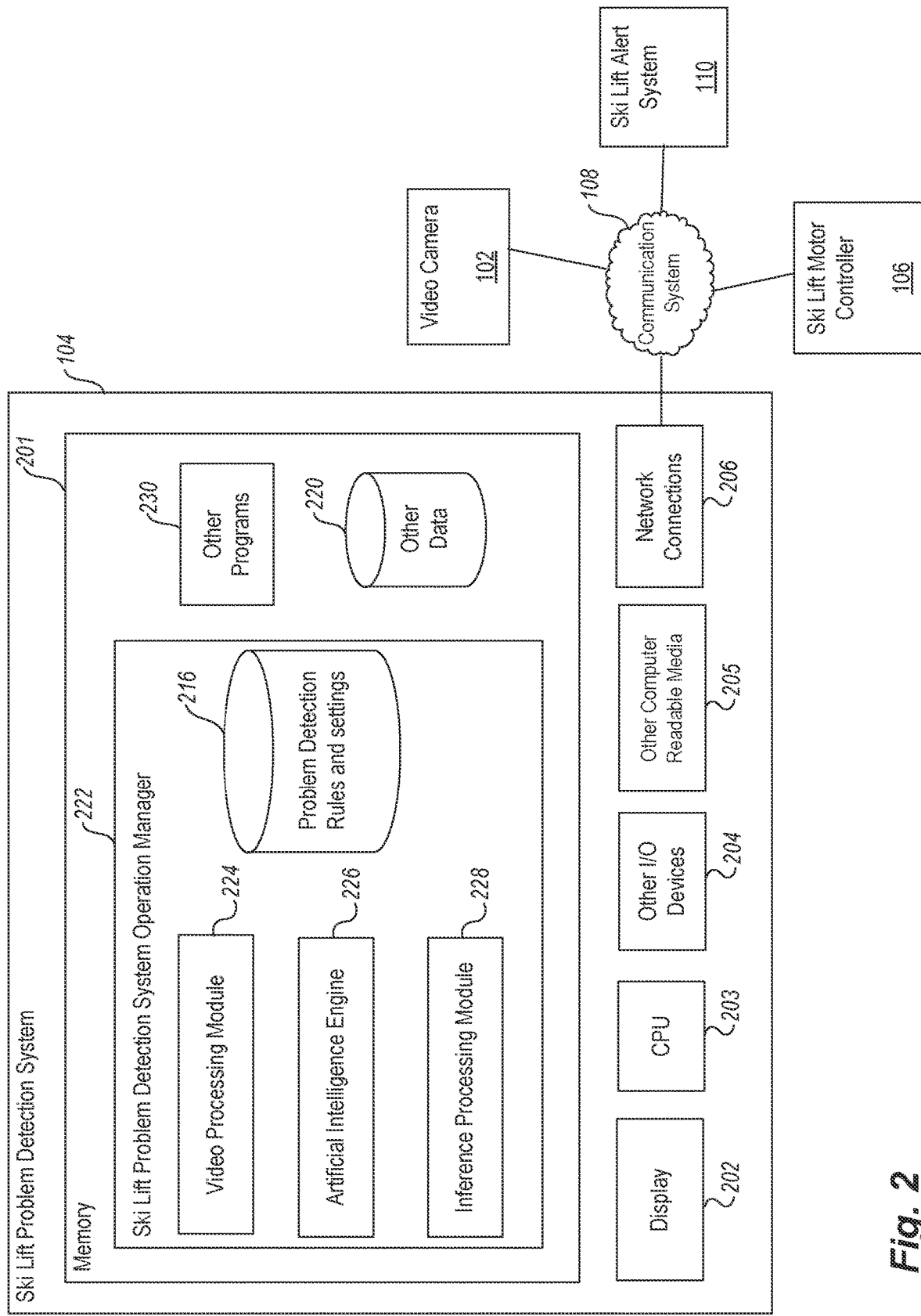
FIG. 2 is a block diagram illustrating elements of an example ski lift problem detection system, according to one example embodiment.

FIG. 2 is a block diagram illustrating elements of an example ski lift problem detection system 104, according to one example embodiment.

Shown in FIG. 2 are one or more video cameras 102 trained on the observation area (i.e., the on-boarding or off-boarding areas of a given lift). A computer network of communication system 108 may connect the one or more video cameras 102, one or more processing units (e.g., CPU 203) of the ski lift problem detection system 104, the ski lift alert system 110 and the ski lift motor controller 106. In some embodiments, the one or more video cameras 102 may be part of or otherwise integrated with the ski lift problem detection system 104 as one device.

Power is also provided to the one or more video cameras 102, ski lift problem detection system 104, the ski lift alert system 110 and the ski lift motor controller 106 via a powerline connection, power outlet, generator, or one or more batteries, or a combination thereof. Electrical connectivity is provided to the ski lift motor controller 106 and may be controlled by the ski lift problem detection system operation manager 222 via communication system 108 so the ski lift problem detection system 104 can interact with the lift to slow it down, stop and/or restart it according to output from the inference processing module 228. The inference processing module 228 may also determine when to start or speed up the lift based on the inferences that a problem situation has been resolved or no longer exists. In some embodiments, such control of the ski lift motor controller 106 may have a manual override or confirmation step or process optionally provided for the ski lift operator to perform before or during starting or speeding up of the ski lift.

The one or more video cameras 102 feed live video to the video processing module 224. The video processing module 224 performs the video processing described herein and feeds the resulting sequences of images to the AI engine 226 (which in some embodiments may be situated on the same processing unit, such as CPU 202). The AI engine 226 makes an inference regarding the activity represented by the sequence of images. This inference is fed to the inference processing module 228, which determines if the inference processing module 228 should send an alert or interact with the lift motor controller 106. If so, the inference processing module 228 will interact accordingly with the motor controller 106.

In various embodiments, the video processing module 224, inference processing module 228, and AI engine 226 may be located remotely from the ski lift problem detection system 104, such as on one or more servers in communication with the ski lift problem detection system 104 over communication system 108. Maintenance of the video processing module 224, inference processing module 228, and AI engine 226 of the ski lift problem detection operation manager 222 may follow software delivery practices that enable the AI engine 226, video processing module 224, inference processing module 228 to receive software upgrades and adjustments.

An example embodiment of the system for improved ski lift operations "watches" the on-boarding and off-boarding locations of a given ski lift (the "scene"). The inference processing module 228 of the ski lift problem detection system 104 infers developing situations in the scene and initiates one or more actions to mitigate or otherwise address potential problems when the artificial intelligence (AI) engine determines that the situation warrants it. For example, the inference processing module 228 may compare the detected potential problem situation to a plurality of potential problem situations to determine a match of the detected potential problem situation to a matching one of the plurality of potential problem situations. The inference processing module 228 may then select an action to initiate or perform according to a rule associated with the matching one of the plurality of potential problem situations. Such rules may be stored in and accessible from the problem detection rules and settings storage 216, which, in some embodiments, may be located remotely from the ski lift problem detection system 104 and accessible via communication system 108. The inference processing module 228 may then initiate the selected action to address the potential problem situation in the one or more of the on-boarding and off-boarding area of the ski lift while the potential problem situation still exists.

The ski lift problem detection operation manager 222 performs video collection via the video camera 102, performs video processing via the video processing module 224, identifies normal or developing problem situations in the video feed via the artificial intelligence engine 226, and performs motor-control/alert-system integration via the operably connected ski lift motor controller 106 and the operably connected ski lift alert system 110. Example functions of the ski lift problem detection system include, but are not limited to: real-time video capture of skiers on-boarding and off-boarding ski lifts via the video camera 102; processing of the video into sequences of individual video frames via the video processing module 224; analysis of the frame sequences by the AI engine 226 using an AI engine 226 trained to assess sequences of frames and identify normal or developing problem situations taking place in the scene; and in the event of developing problem situations, interaction with the ski-lift motor controller 106 and/or the ski lift alert system 110 to alert the human lift attendant and/or directly initiate a slow-down or complete stop of the ski-lift as the situation demands.

The ski lift problem detection system 104 performs collection of video footage from one or more video cameras 102 situated such that they record activity in the area of interest (e.g., on-boarding and/or off-boarding areas of a given ski lift). In various embodiments, multiple cameras may be used to capture video from various different locations and angles of view of the ski lift, including, in some embodiments, areas of the ski lift outside the on-boarding and/or off-boarding areas.

The video may be collected real-time by the ski lift problem detection system 104 and fed to the video processing module 224, where it is decomposed into individual frames. The individual frames are cropped and resized by the video processing module 224 and are then assembled in manageable sequences of frames to be fed to the AI engine 226. The number of frames in a given sequence may vary from location to location, and may be determined based on the AI engine's capabilities to produce the desired inference accuracy. For example, in one embodiment, a video camera may capture video of the off-boarding area of a ski lift at 30 frames per second and 1050×1500 resolution. The video capture and processing performed by the video camera 102 and the video processing module 224 would extract all of the frames in the video, crop each frame to as small an area as is possible while still covering the monitored area, resize the images to, for example, 299×299 resolution, and build sequences consisting of four frames, each 0.5 seconds apart. These sequences then represent a 2-second long view of what's happening in the scene, and become the input to the AI engine 226. How these sequences may be used is detailed in the image-sequence curation, training of the AI engine 226, and operationalization of the system described herein.

In order to train the AI engine 226 to correctly determine if a sequence of frames represents normal conditions or a developing problem situation (e.g., an abnormal on-boarding or off-boarding process) the AI engine 226 is taught what is normal and what is abnormal. This is accomplished by "training" the model used by the AI engine 226. In one embodiment, the AI model is trained via a process of supervised learning. Supervised learning is the machine learning task of inferring a function from labeled training data. For example, when using supervised learning, the training the AI engine 226 may involve showing the AI model used by the AI engine 226 a sequence of frames and telling the AI model "this is normal" or "this is a problem". In other words, the model is given many examples of "normal" and "not normal" sequences of frames, from which it "learns" what constitutes normal and what constitutes a developing problem situation.

The process of creating these frame sequences and labeling them with the desired outcome is called curation. For example, a sequence of four frames where the skiers all ski away normally would be labeled as "normal", or "green, or some other identifier to which the Inference Processing module 228 can react. Conversely, a sequence of frames showing a skier falling in the off-boarding area and entirely blocking the path for subsequent skiers represents an abnormal off-boarding process and this may be labeled as something like "red", which the inference processing module 228 could interpret as "stop the lift". A sequence of events that represents an abnormal on-boarding or off-boarding process may include, but is not limited to, one or more of: a lift rider falling while on-boarding the ski lift; a lift rider falling while off-boarding the ski lift; a lift rider lying or sitting the ground in a lift chair loading zone; a lift rider being dragged by a ski lift chair; a ski pole or other equipment of a lift rider being caught in a ski lift chair; a lift rider proceeding to on-board the ski lift late; a lift rider failing to exit off-boarding area; a lift rider being in an abnormal position on a lift chair after on-boarding the ski lift; a lift rider starting to slip off a lift chair after on-boarding the ski lift; a lift rider leaving a lift chair loading zone as a lift chair is approaching the lift rider; a lift rider under a pre-determined size in a lift chair loading zone as a lift chair is approaching the lift rider; a number of lift riders being in a lift chair loading zone that is over a pre-determined limit of lift riders for a lift chair; a lift rider facing a wrong direction in a lift chair loading zone as the lift chair is approaching the lift rider; a lift rider being in an incorrect position within a lift chair loading zone as the lift chair is approaching the lift rider; an incorrect number of lift riders off-boarding a lift chair compared to a number of lift riders that on-boarded the lift chair; an incorrect number of lift riders on a lift chair compared to a number of lift riders that were in a lift chair loading zone for the lift chair when the lift chair arrived for on-boarding; a mechanical problem with a lift chair of the ski lift; a mechanical problem with operation of the ski lift; and a problem with a structural element of the ski lift.

Frequently, curation is a manual process, though in some embodiments, it is automated. For example, existing video footage of people on- and off-boarding from ski lifts may be processed by the video processing module 224 into frame sequences and manually curated to build the set of sequences on which the model is trained. When training the AI engine 226, many thousands of curated sequences will be used, so that the model sees thousands of scenarios, increasing its accuracy.

In some embodiments, the AI engine may be trained using active machine learning in which a learning algorithm interactively queries the user (or some other information source) to obtain the desired outputs at new data points. In statistics literature this is sometimes also called optimal experimental design. The learning algorithm of the AI engine 226 may actively query the user/teacher for labels. This is a type of iterative supervised learning. Since the learner chooses the examples, the number of examples to learn a concept can often be much lower than the number required in normal supervised learning. Other embodiments may use multi-label active learning, hybrid active learning and active learning in a single-pass context. Some embodiments combine concepts from the field of machine learning (e.g., conflict and ignorance) with adaptive, incremental learning policies in the field of online machine learning.

In some embodiments, the AI engine 226 may be trained using unsupervised learning, or may perform supervised or unsupervised learning during operation. Unsupervised learning is a type of machine learning algorithm used to draw inferences from datasets consisting of input data without labeled responses. In some embodiments, the AI engine 226 may use unsupervised learning in that the data set used for training may be images or sequences of images that are not labeled or curated. For example, when performing unsupervised learning, the ski lift problem detection system 104 may use cluster analysis, which is used for exploratory data analysis to find hidden patterns or grouping in the key entities and relationships extracted from the images, sequences of images or other data used to train the AI engine 226.

The AI engine 226 is able to "see" what is happening in a given video frame and examine a sequence of frames such that a given frame is seen in context of the previous frames. This is important in that a given situation, e.g., a single skier skiing away from the lift, can be good or bad depending on what was happening before the skier skied away. If, for example, three people got off the lift but only one skied away, there was possibly a problem wherein two skiers fell down (e.g., "red" scenario). Alternatively, if only one skier got off the lift and that one skier skied away, then all is good (e.g., "green" scenario). This context-based awareness can be accomplished, for example, by adding a Long Short-Term Memory (LSTM) component to the AI model used by the AI engine 226. LSTMs are a kind of recurrent artificial neural network capable of learning long-term dependencies. LSTMs also have a chain like structure, but the repeating module has a different structure than more basic recurrent neural network blocks. In particular, the LSTM recurrent artificial neural network blocks include a "cell state". The cell state can be analogized to a conveyor belt that runs straight down the entire chain of blocks, with only some minor linear interactions. This allows information to easily flow along it unchanged. Instead of having a single neural network layer, there are multiple layers interacting in a specific way to enable the long-term dependencies.

In particular, there is a sigmoid layer called the "forget gate layer" which decides what information gets discarded from the cell state. This may also be referred to as a "forgetting artificial neural network" that, in one embodiment, determines which of the previously generated determinations of the AI engine 226 regarding what is a "red" scenario and what is a "green" scenario are reintroduced by the LSTM in the subsequent iterations of determinations.

The LSTM also includes a tan h layer that creates a vector of new candidate values that could be added to the cell state. This may also be referred to as a "generation artificial neural network" that, in one embodiment, generates determinations during a number of iterations of the LSTM of the AI engine 226.

The LSTM also decides what new information is going to be stored in the cell state. This is performed by a sigmoid layer called the "input gate layer" that decides which values will be updated. This may also be referred to as an "ignoring artificial neural network" that, in one embodiment, filters the generated predictions of the LSTM of the AI engine 226 based on relevancy. The memory structure reintroduces (adds) these previously generated predictions from this layer to be used in subsequent iterations of predictions.

There also exists another sigmoid gate which decides what parts of the cell state are going to be output. The cell state is then output to a tan h layer (to push the values to be between −1 and 1) and then multiplied by the output of the sigmoid gate, so that only the parts decided by the previous layers are output from the block. This may also be referred to as a "selection artificial neural network" that, in one embodiment, determines which of the generated predictions of the LSTM to release to an output system and which of the predictions to retain internally in the artificial neural networks only for use in the subsequent iterations of predictions. Such an LSTM artificial neural network architecture is one example embodiment and other LSTM architectures that enable learning of learning long-term dependencies may also be used by the AI engine 226.

In one example embodiment example, "seeing" what is happening in a given video frame can be accomplished by building a Convolutional Neural Network (CNN) component using the Tensorflow framework. The CNN may comprise of convolutional layers, pooling layers, and fully-connected layers. The number of nodes in each of these layers can be adjusted to tune the "seeing" part of the model to improve performance. Alternatively, other constructs, such as a Capsule Network built with the Tensorflow or Pytorch framework could be used.

The Tensorflow or Pytorch frameworks may also be used to build the LSTM layer of the model, using constructs available in those frameworks. In this layer, one can adjust the number of frames in the examined sequence as well as the number of nodes in the LSTM layer to tune the AI model used by the AI engine 226. The tuning adjustments described herein, i.e., the number of nodes, or number of frames, etc., are called hyperparameters. Hyperparameter tuning is an important aspect to AI engine 226 development and training.

The AI engine 226 in the system may be trained to identify various scenarios using curated data. Such scenarios may include "normal", "problem might be developing—keep an eye on this", "minor problem", and "major problem". Other types and categories and labels of scenarios may also or instead be used in various different embodiments. Training the AI model used by the AI engine 226 may be accomplished by feeding the AI model thousands of curated data sets and letting the model, via a multitude of computations, determine what it thinks is happening in each data set. The model's answer is then compared to the correct answer for the data set. For example, the model may predict that a given data set is a "minor problem" condition, but it's really a "normal" condition. If the model's answer is incorrect, adjustments are made to the model via a process called backpropagation, and the process is repeated. This sequence of compute-compare-adjust is repeated many times until the model produces the desired prediction accuracy.

In some embodiments, the data set used for training is a large number of images grouped into the individual categories of "normal", "problem might be developing—keep an eye on this", "minor problem", and "major problem". In addition to the training data set, a separate group of images with the same categories may be kept and is called the validation set. This data set is not used during training, but for testing the quality of the trained model. In some embodiments, data augmentation is applied to the data set such has random crop (rotation & shifting), resolution scaling, grayscale conversion, color distortion, vertical and horizontal flip, shearing, and stretching. The validation set is used at every "epoch" of training. One epoch is a complete pass through all the training data. Training involves many epochs as the AI engine 226 passes through the data set, adjusting weights to make the classifier more accurate. After one epoch, the validation data set is used and the system can get an accuracy percentage from it. This is important because the system can train so much that the neural network starts memorizing pixels and irrelevant information from the data set, called overfitting. But then because the system just started memorizing color or pixels, it will underperform on data the system has not seen before, the validation set. So to prevent the neural network from overfitting, the system may use a validation set as a threshold of when to stop training.

For example, in one embodiment, there may be a separate folder of images (e.g., stored in the other data storage 220) that the neural network of the AI engine 226 has not seen before. The neural network is pointed to that folder and the neural network will initialize the training process. For training, one embodiment uses Nvidia Digits because it has a graphical user interface that can adjust learning rates and training sets.

In one embodiment, the machine learning model that receives the highest validation accuracy is sent to AI engine 226 of the ski lift problem detection system 104 periodically, such as every day. The data may be trained on one or more remote servers due to alleviate large hardware requirements. For example, such processing may be hosted by Amazon Web Services (AWS). In other embodiments, this training may be done locally by the AI engine 226. New data can be uploaded for training every day and a new model is sent to the AI engine 226 after meeting accuracy requirements. In this way, the AI engine 226 can fix mistakes in its accuracy and increase confidence on correct classifications. For example, the new data may be the images of operations of the ski lift on-boarding and off-boarding areas. Since the ski lift problem detection system 104 initially has never seen the ski lift and the environment the ski lift is in, it can have low accuracy. As more images of the ski lift on-boarding and off-boarding areas are uploaded for training, accuracy increases. A module of the ski lift problem detection system operation manager 222 (e.g., the inference processing module 228) or other programs 230 may cause the ski lift problem detection system 104 to automatically upload these images, at the discretion of the ski lift or ski area operator. For example, the inference processing module 228 may feed the image sequences, along with their inferences to a module in 222 that would do the uploading.

The more processing capability the AI engine 226 has, the more frequently model updates can be done for that AI engine 226. Note that in some embodiments, the classifications or categorization (also known as "inference" in deep learning") occur at a remote server in communication with the ski lift problem detection system 104 over communication system 108, and not on the ski lift problem detection system 104. Because a remote server may have hardware with higher processing power than the deployed ski lift problem detection system 104, training flows may involve the ski lift problem detection system 104 uploading a new data set, training the data set on a bigger, high-accuracy convolutional neural network that automatically categorizes the data, and then training a smaller neural network on the newly categorized data that can be sent to the deployed ski lift problem detection system 104 from the server. The new data set may be used to train a larger convolutional neural network. But the point of the large, high-accuracy convolutional neural network is to automatically categorize the new data set and fix the mistakes of the small neural network. The categorized data set is then used to train the small neural network, and a new version is then deployed.

Training systems and methods for improved operations of ski lifts may involve a neural network trained on a database of images, then locking the top layers, removing the last connected layer, creating a new last layer with the desired number of categories, and adjusting the hyperparameters. Many neural networks are publicly available online. A list of them for the Caffe framework is at https://github.com/BVLC/caffe/wiki/Model-Zoo. One can download them from github directly. In one example, SqueezeNet may be used, which is made to run on mobile devices and does not require a large amount of power, but gives up some accuracy. However, different neural networks are available and contemplated for performing the functionality described herein.

A neural network for images typically includes of convolutional layers connected to each other. Locking the top layers means those layers are not allowed to learn or change their weights. It is found that after training large diverse data sets, the top layers do not change a large amount. This is because the top layers are those that start recognizing basic shapes and lines in pictures, which is useful for many different image recognition tasks. Locking the top layers does not allow the weights to change on the top layers, but allows the bottom layer to learn and change weights. Since the bottom layer can learn and change its weights, it can be made specific to one's image recognition task.

Adjusting hyperparameters refers to higher level "knobs" that can be changed and adjusted for training. One common hyperparameter is the learning rate. By making the learning rate large, the neural network can learn quickly. By making the learning rate small, the neural network will learn slower and can get stuck in a certain local minima, resulting in a fixed, substandard accuracy. In particular, the problem is that a low learning rate causes the AI system to get stuck in a local low spot in the loss curve. An example will be provided to explain this. When the system starts training, a larger learning rate can be set. The accuracy can jump from 0% to 60%, then down to 30%, then up to 70%. It can vary widely. However, one can take the model that hit 70% and set a smaller learning rate. Then the neural network can creep up from 70% to 75%, to 78% accuracy, etc.

Different frameworks for neural networks involve different amounts of coding. Some frameworks allow one to describe the network in python, so one can connect the convolutional layers together with python. Caffe uses protobuf, which is what may be used to adjust the layers and change learning rates. It is basically a structured way of describing a network. There currently exist many machine learning tools which are referred to as "frameworks". They are middleware which make it easier to build a neural network and train. Tensorflow is one example, but Caffe may be preferable in some embodiments because it handles images well.

Although in some embodiments, the ski lift problem detection system 104 implements an algorithm to remove duplicate images, the ski lift problem detection system 104 may save transitions for training because it adds more diversity to the data set. For example, when a classification changes from "minor problem" to "major problem", the ski lift problem detection system 104 will save both images or sequences for training. Movement detection can be implemented by watching transition changes in classifications. Also, detecting if the image is a duplicate of the previous image is a straightforward way of detecting movement. Although in one embodiment the data set only includes images, in other embodiments, models can also be trained on video and sound. Detecting the difference between the sound of a lift rider successfully on-boarding and a lift rider falling may be useful for aiding classification of problem scenarios.

In one embodiment, the ski lift problem detection system 104 may be a device or electronic equipment that is operable to receive and process images and/or video of the ski lift and communicate data regarding the images and/or video as described herein. Note that one or more general purpose or special purpose computing systems/devices may be used to operate the ski lift problem detection system 104, store information regarding the ski lift problem detection system 104, store adjustment settings and communicate with the video camera 102, the ski-lift motor controller 106 and/or the ski lift alert system 110. Such adjustment settings may be stored in the ski lift problem detection system problem detection rules and settings storage 216. In one embodiment, the computing system may be a local system-on-a-chip (SoC) system, such as, for example, Raspberry Pi. However, other processors and computing platforms may be used. In addition, the ski lift problem detection system 104 may comprise one or more distinct computing systems/devices and may span distributed locations. Furthermore, each block shown may represent one or more such blocks as appropriate to a specific embodiment or may be combined with other blocks. Also, the ski lift problem detection system operation manager 222 may be implemented in software, hardware, firmware, or in some combination to achieve the capabilities described herein.

In the embodiment shown, ski lift problem detection system 104 comprises a computer memory ("memory") 201, a display 202 (including, but not limited to a light emitting diode (LED) panel, liquid crystal display (LCD), touch screen display, etc.), one or more Central Processing Units ("CPU") 203, Input/Output devices 204 (e.g., button panel, keyboard, mouse, RF or infrared receiver, universal serial bus (USB) ports, other communication ports, and the like), other computer-readable media 205, and network connections 206. The ski lift problem detection system operation manager 222 is shown residing in memory 201. In other embodiments, some portion of the contents and some, or all, of the components of the ski lift problem detection system operation manager 222 may be stored on and/or transmitted over the other computer-readable media 205. The components of the ski lift problem detection system 104 and ski lift problem detection system operation manager 222 preferably execute on one or more CPUs 203 and perform or otherwise facilitate capturing digital video of one or more of on-boarding and off-boarding operations of a ski lift; generating a plurality of digital images of the one or more of on-boarding and off-boarding operations of the ski lift based on the captured digital video; automatically detecting, in real-time as the digital video is being captured, as the ski lift is operating, a potential problem situation in one or more of an on-boarding area and an off-boarding area of the ski lift based on the plurality of digital images; and initiating an action, by the at least one computer processor, as the ski lift is operating, to address the potential problem situation in the one or more of the on-boarding area and off-boarding area of the ski lift while the potential problem situation still exists, as described herein. In other embodiments, other processing devices and configurations may be used, including, but not limited to, graphics processing units (GPU), ASICs and embedded CPU/GPU blocks, Neural Processing Units (NPU), Intelligence Processing Units (IPU), and Deep Learning Accelerators (DLA). Such processors often have functionality that accelerates the execution of matrix math for convolutional neural networks enabling the systems and methods for improved operations of ski lifts described herein to classify and/or train faster. The ski lift problem detection system operation manager 222 may operate as, be part of, or work in conjunction and/or cooperation with various software applications stored in memory 201. The ski lift problem detection system operation manager 222 also facilitates communication the video camera 102, the ski-lift motor controller 106, the ski lift alert system 110, peripheral devices and/or other systems, such as a remote server, via the I/O devices 204 and/or the network connections 206.

Recorded or buffered digital video of the ski lift areas received may reside on the other data repository 220, for storing, processing, analyzing, communicating and displaying of the received images from digital video captured by the camera 232. The other data repository 220 may also store various video and image metadata associated with the recorded or buffered video and images in the other data repository 220, such as that including, but not limited to, resolution indicators, format indicators, tags, codes, labels, curation information, identifiers, format indicators, timestamps, user identifications, authorization codes, digital signatures, etc.

The video processing module 224 is configured to decompose the received video into individual frames, crop and resized the frames and then assemble the frames in manageable sequences to be fed to the AI engine 226. The AI engine 226 is configured to analyze the plurality of digital images (e.g., sequences of images) and detect in real-time as the digital video is being captured, and as the ski lift is operating, a potential problem situation in one or more of an on-boarding area and an off-boarding area of the ski lift based on the plurality of digital images. This may include, for example, determining which of the plurality of digital images of the ski lift area generated corresponds to which of a plurality of different recognized classifications or types of potential problems. The AI engine 226 may be trained to recognize such images or sequence of images by training, for example, a convolutional multi-layer neural network either resident within the memory 201, other programs 230 and/or on a remote server, to detect the potential problem situation. This may be accomplished by training the convolutional multi-layer neural network using a database of images or different sequences of images representative of corresponding different potential problem situations, wherein each image is tagged or labeled as associated with a particular potential problem situation. For example, each different potential problem situation may be designated as representative of a corresponding different one the states: "normal", "problem might be developing—keep an eye on this", "minor problem", and "major problem".

The video processing module 224 may also decode, decompress, format, translate, perform digital signal processing, adjust data rate and/or complexity or perform other processing on the data representing received video and/or images of the ski lift area as applicable for processing and, in some embodiments, presenting the data in real time or near real time as it is being received by the ski lift problem detection system 104. Such video sequences detected as representing a potential problem situations and corresponding alerts may also be communicated, via communication system 108, to remote devices, such as mobile devices, smartphones or tablets in real-time or near real-time as the potential problem situation is occurring.

Other code or programs 230 (e.g., further audio/video processing modules, a program guide manager module, a Web server, and the like), and potentially other data repositories, such as data repository 220 for storing other data (user profiles, preferences and other configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the ski lift problem detection system 104 and ski lift problem detection system operation manager 222 includes an application program interface ("API") that provides programmatic access to one or more functions of the ski lift problem detection system 104 and operation manager 222. For example, such an API may provide a programmatic interface to one or more functions of the ski lift problem detection system operation manager 222 that may be invoked by one of the other programs 230, the video camera 102, the ski lift alert system 10, the ski lift motor controller 106, a mobile device (not shown), a server (not shown) or some other module or remote system. In this manner, the API may facilitate the development of third-party software, such as various different service applications, user interfaces, plug-ins, adapters (e.g., for integrating functions of the ski lift problem detection system operation manager 222 into desktop or mobile applications), and the like to facilitate systems and methods for improved operations of ski lifts using the ski lift problem detection system 104.

In an example embodiment, components/modules of the ski lift problem detection system 104 and the ski lift problem detection system operation manager 222 are implemented using standard programming techniques. For example, the ski lift problem detection system operation manager 222 may be implemented as a "native" executable running on the CPU 203, along with one or more static or dynamic libraries. In other embodiments, the ski lift problem detection system 104 and ski lift problem detection system operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Scratch, Python, JavaScript, VBScript, and the like), or declarative (e.g., SQL, Prolog, and the like).

In a software or firmware implementation, instructions stored in a memory configure, when executed, one or more processors of the ski lift problem detection system 104 to perform the functions of the ski lift problem detection system operation manager 222. The instructions cause the CPU 203 or some other processor, such as an I/O controller/processor, to perform the processes described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer (e.g., Bluetooth® wireless technology providing a communication channel between the ski lift problem detection system 104 and a mobile device), running on one or more computer systems each having one or more CPUs or other processors. Some embodiments may execute concurrently and asynchronously, and communicate using message passing techniques. Equivalent synchronous embodiments are also supported by a ski lift problem detection system operation manager 222 implementation. Also, other functions could be implemented and/or performed by each component/module, and in different orders, and by different components/modules, yet still achieve the functions of the ski lift problem detection system 104 and operation manager 222.

In addition, programming interfaces to the data stored as part of the ski lift problem detection system 104 and ski lift problem detection system operation manager 222, can be available by standard mechanisms such as through C, C++, C#, and Java APIs; libraries for accessing files, databases, or other data repositories; scripting languages; or Web servers, FTP servers, or other types of servers providing access to stored data and machine learning models. The ski lift problem detection system problem detection rules and settings storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the ski lift problem detection system operation manager 222.

Furthermore, in some embodiments, some or all of the components of the ski lift problem detection system 104 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a flash memory device) so as to enable or configure the computer-readable medium and/or one or more associated computing systems or devices to execute or otherwise use, or provide the contents to perform, at least some of the described techniques.

Figure 3:
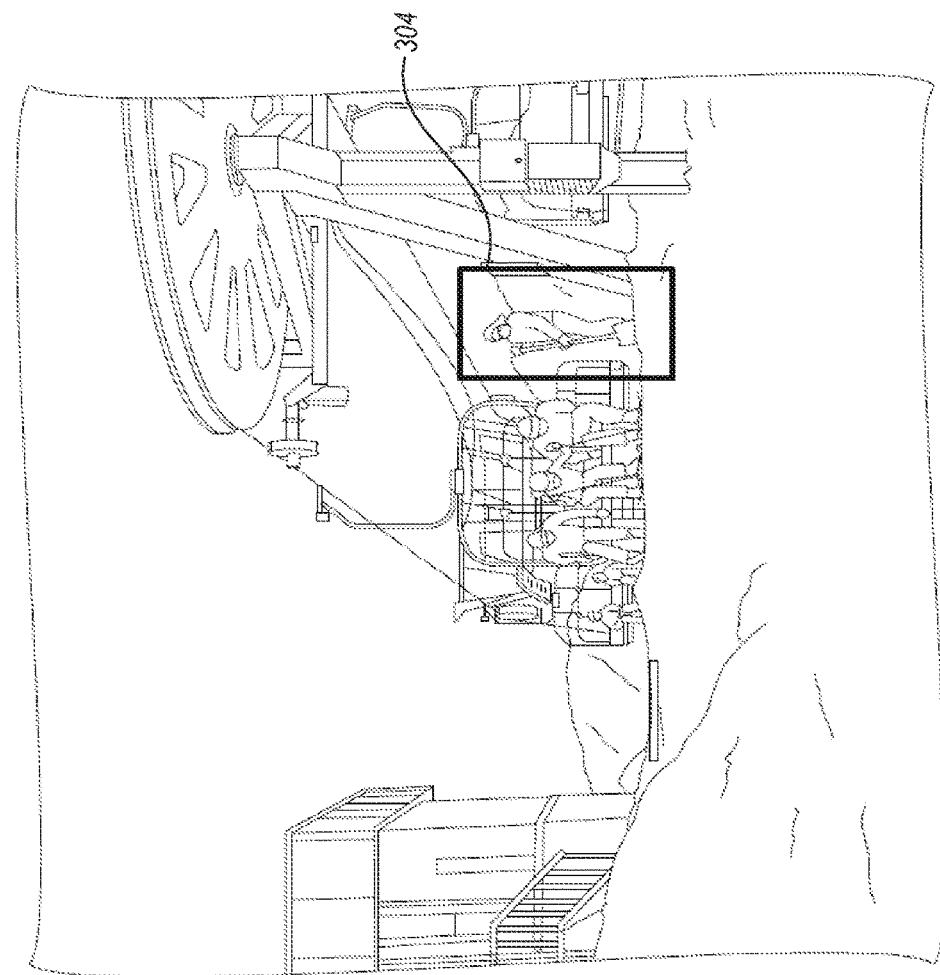
FIG. 3 is a diagram of an example ski lift at an off-boarding area showing a ski lift operator in a first position.

FIG. 3 is a diagram of an example ski lift at an off-boarding area 302 showing a ski lift attendant 304 in a first position. As shown in FIG. 3, the lift attendant 304 is out of position to quickly slow or stop the lift if necessary in case a problem situation arises when the lift riders are off-boarding the ski lift. Advantageously, the ski lift problem detection system 104 may automatically slow or stop the ski lift upon detection by the ski lift problem detection system 104 of a potential problem situation represented in captured video sent from the video camera 102 to the ski lift problem detection system 104. The scene shown in FIG. 3 is from an example viewpoint of the camera 102 and the image shown in FIG. 3 may be a frame of a sequence of video frames of the captured video sent from the video camera 102.

Figure 4:
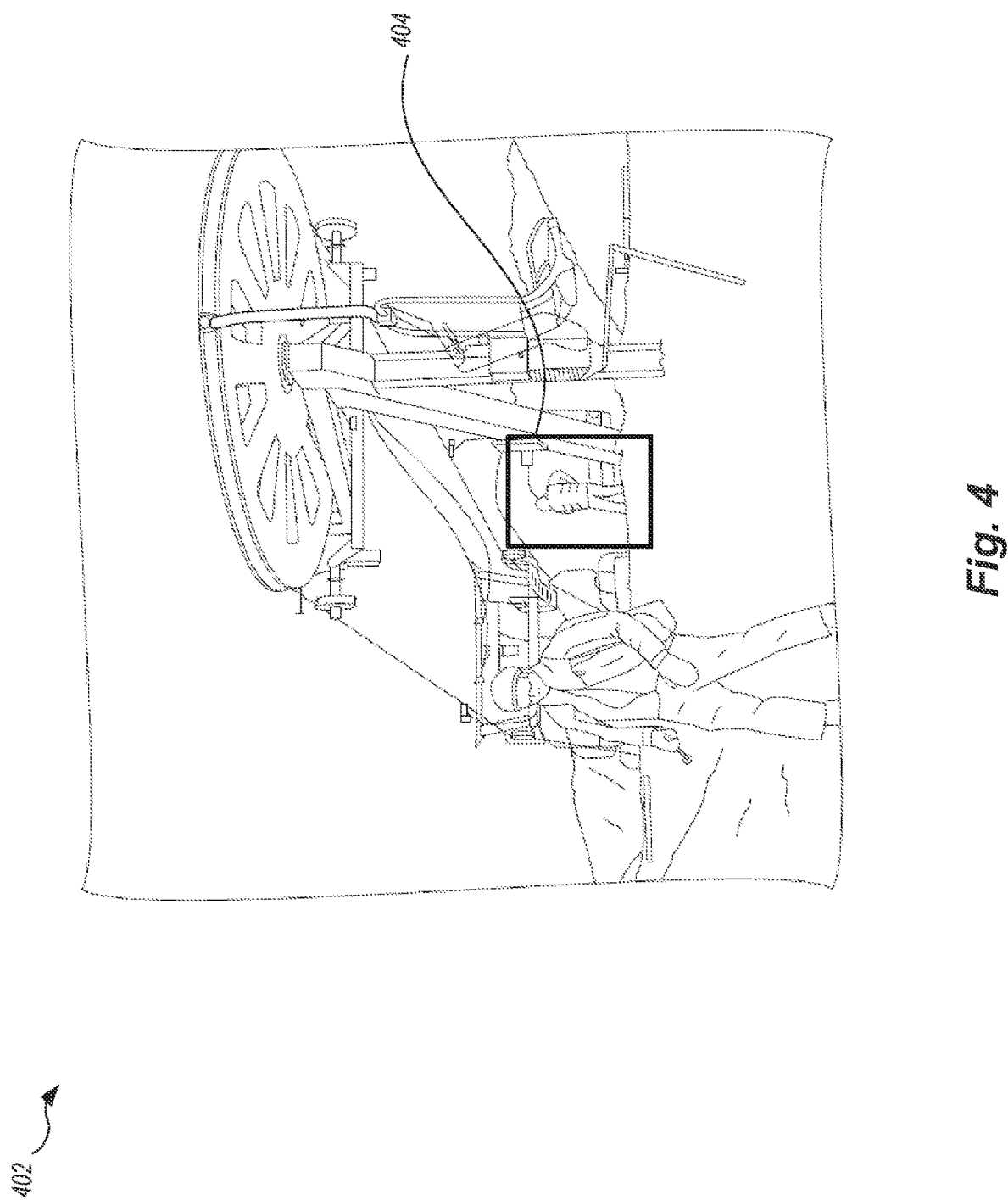
FIG. 4 is a diagram of an example ski lift at an off-boarding area showing a ski lift operator in a second position.

FIG. 4 is a diagram of an example ski lift at an off-boarding area 402 showing a ski lift attendant 404 in a second position. As shown in FIG. 4, the lift attendant 404 has their back to the action and would not see if the off-boarding skier had fallen when off-boarding the ski lift chair and thus is would not be able to recognize the problem situation in a timely manner and quickly slow or stop the lift. Advantageously, the ski lift problem detection system 104 would automatically slow or stop the ski lift if the skier had fallen when off-boarding the ski lift chair upon detection by the ski lift problem detection system 104 based on captured video sent from the video camera 102 to the ski lift problem detection system 104. The scene shown in FIG. 3 is from an example viewpoint of the camera 102 and the image shown in FIG. 3 may also be a frame of a sequence of video frames of the captured video sent from the video camera 102.

Figure 5:
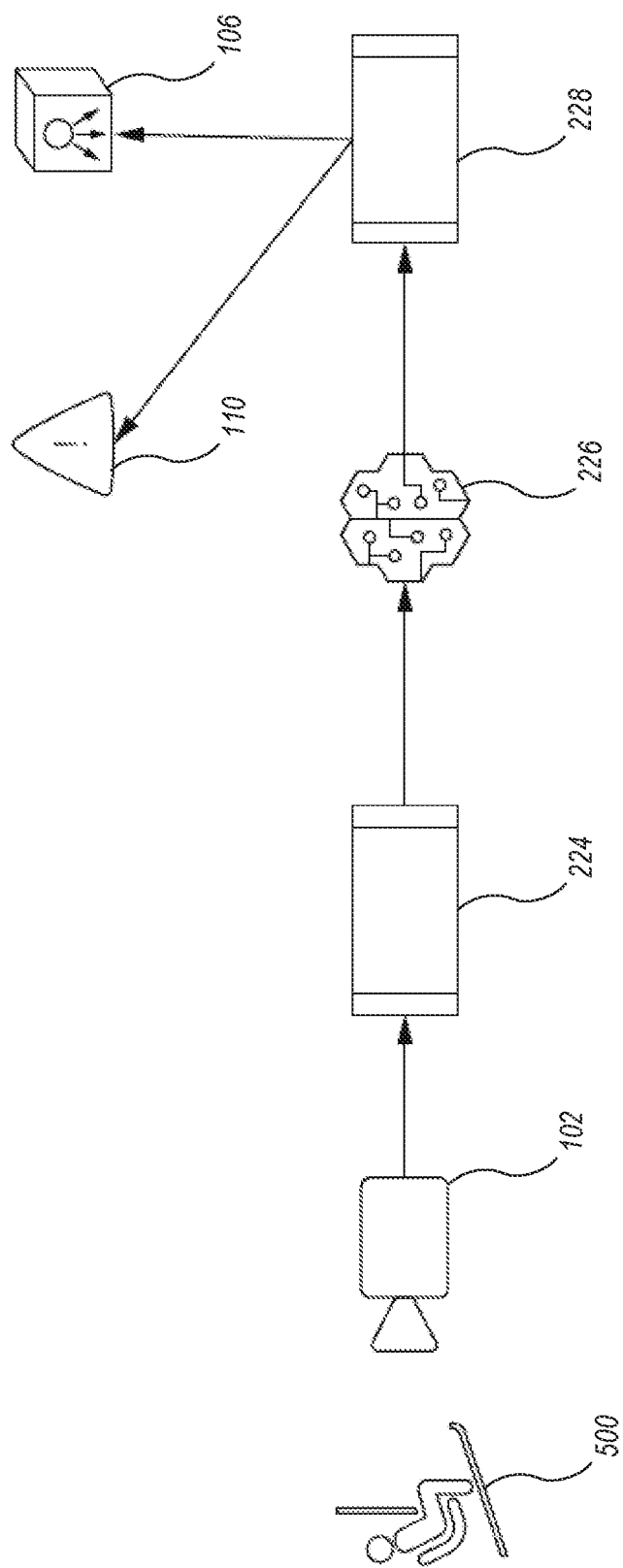
FIG. 5 is a block diagram illustrating a flow of operations between various elements of an example system for improved operations of ski lifts, according to one example embodiment.

FIG. 5 is a block diagram illustrating a flow of operations between various elements of an example system for improved operations of ski lifts, according to one example embodiment.

The video camera 102 monitors one or more lift riders 500 in an on-boarding and/or off-boarding area of the ski lift. The video processing module 224 of the ski lift problem detection system 104 extracts individual image frames from video the feed and then may crop, resize, and assemble them into a sequence for consumption by the AI engine 226. Some of these data may be persisted for use in further training and refining the AI engine 226 as described herein.

The AI engine 226 receives sequences of images and infers the situation in the scene. Such inferences may be based on the training of the AI model and may be specific to a given lift. For example, parameters associated with a given lift may be stored by the ski lift problem detection system 104 in the problem detection and rules settings storage 216 and accessible from the problem detection and rules settings storage 216. In some embodiments, the problem detection and rules settings storage 216 may be located remotely from the ski lift problem detection system 104 and accessible via communication system 108. The problem detection and rules settings storage 216 may store rules, settings and parameters for a plurality of different ski lifts and may be accessible by a plurality of corresponding ski lift problem detection systems of different ski lifts.

The inference processing module 228 receives the inference value from the AI engine 226 and takes or initiates an appropriate action, if any, as the ski lift is operating, to address the potential problem situation. In various different example embodiments, such actions can range from alerting of the human attendant to interacting with the lift motor controller to slowing or stopping the ski lift.

The ski lift alert system 110 may be a sound-based, light-based, or message-based alerting system to prompt the attendant to be ready to take action if necessary. For example, the inference processing module 228 may send an audio alert, a message-based alert and/or a light-based alert to one or more of: a device located on the ski lift, an electronic message board, an alarm on or near the ski lift, a bell on or near the ski lift, a siren on or near the ski lift, an electronic sign or display on or near the ski lift, a mobile device of the attendant, a remote system of the ski lift operator, and a remote system or device of safety personnel or ski patrol.

The inference processing module 228 interacts with the ski lift motor controller 106 to slow or stop the lift depending on the operational rules for the lift. For example, such operational rules may be stored in and accessible from the problem detection rules and settings storage 216, which, in some embodiments, may be located remotely from the ski lift problem detection system 104 and accessible via communication system 108. The motor controller may be an electrical, mechanical or electro-mechanical device that is operable to receive electrical signals to control one or more motors and/or braking systems of the ski lift. The operation of a ski lift may include a looped cable that spans between two large pulleys at each end (the bull wheels). Towers in between support the chairs (the carriers) as they travel up the mountain. At the towers the cable runs through sheaves attached below or above the towers depending on various conditions. Modern ski lifts rely on electric motors to turn the bull wheels. Most also have secondary backup diesel power motors also, for safety. The power and motor may be located at the top or bottom of the chair lift depending on engineering requirements. Power and motor control utilizes electrical contacts and the ski lift motor controller 106 may include electrical, mechanical or electro-mechanical devices to control electrical connectivity of the electrical contacts and circuits to control lift drive systems, starting, stopping, operation, speed and direction of the motor and also braking systems. The particular signals and commands that the inference processing module 228 may use to control different motor controllers and drive systems of various different ski lift motors and systems may be stored in and accessible from the problem detection rules and settings storage 216.

Figure 6:
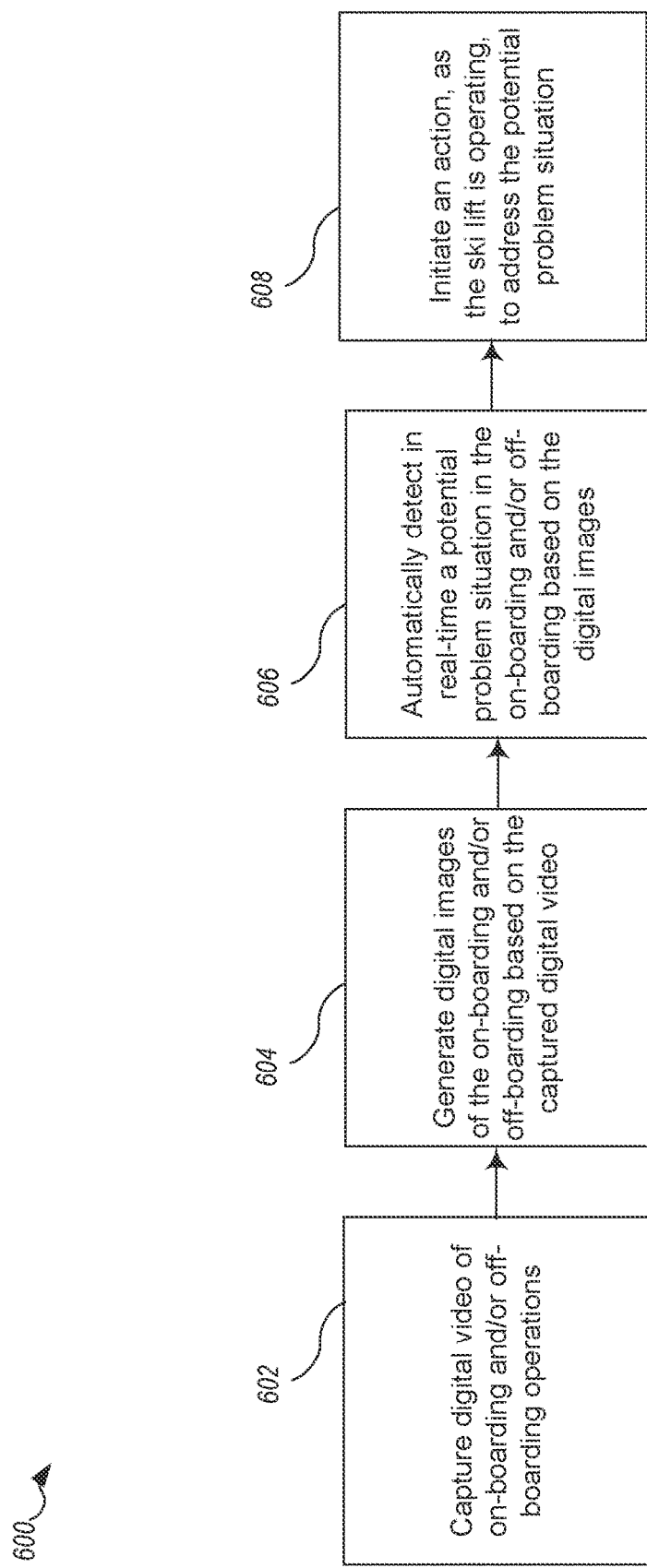
FIG. 6 is a flow diagram of a computerized method for improved ski lift operations, according to one example embodiment.

FIG. 6 is a flow diagram of a computerized method 600 for improved ski lift operations, according to one example embodiment.

At 602, the system captures digital video of one or more of on-boarding and off-boarding operations of a ski lift.

At 604, the system generates, as the ski lift is operating, a plurality of digital images of the one or more of on-boarding and off-boarding operations of the ski lift based on the captured digital video.

At 606, the system automatically detects, in real-time as the digital video is being captured and as the ski lift is operating, a potential problem situation in one or more of an on-boarding area and an off-boarding area of the ski lift based on the plurality of digital images.

At 608, the system initiates an action, as the ski lift is operating, to address the potential problem situation in the one or more of the on-boarding area and off-boarding area of the ski lift while the potential problem situation still exists.

Figure 7:
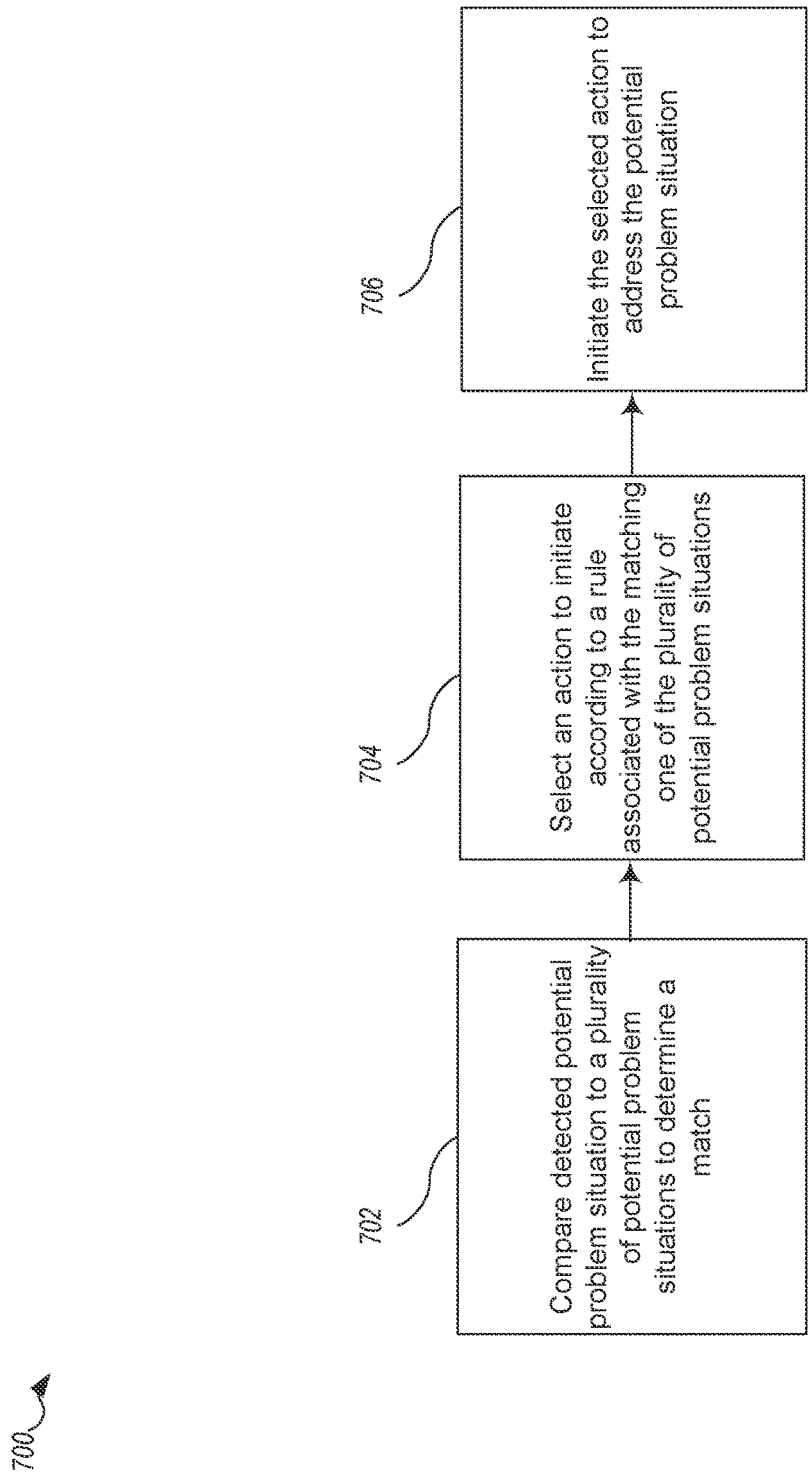
FIG. 7 is a flow diagram of a computerized method for initiating an action to address a potential problem situation in one or more of an on-boarding area and off-boarding area of a ski lift useful in improved ski lift operations, according to one example embodiment.

FIG. 7 is a flow diagram of a computerized method 700 for initiating an action to address a potential problem situation in one or more of an on-boarding area and off-boarding area of a ski lift useful in improved ski lift operations, according to one example embodiment.

At 702, the system compares a detected potential problem situation to a plurality of potential problem situations to determine a match of the detected potential problem situation to a matching one of the plurality of potential problem situations.

At 704, the system selects an action to initiate according to a rule associated with the matching one of the plurality of potential problem situations.

At 706, the system initiates the selected action to address the potential problem situation in the one or more of the on-boarding and off-boarding area of the ski lift while the potential problem situation still exists.

Figure 8:
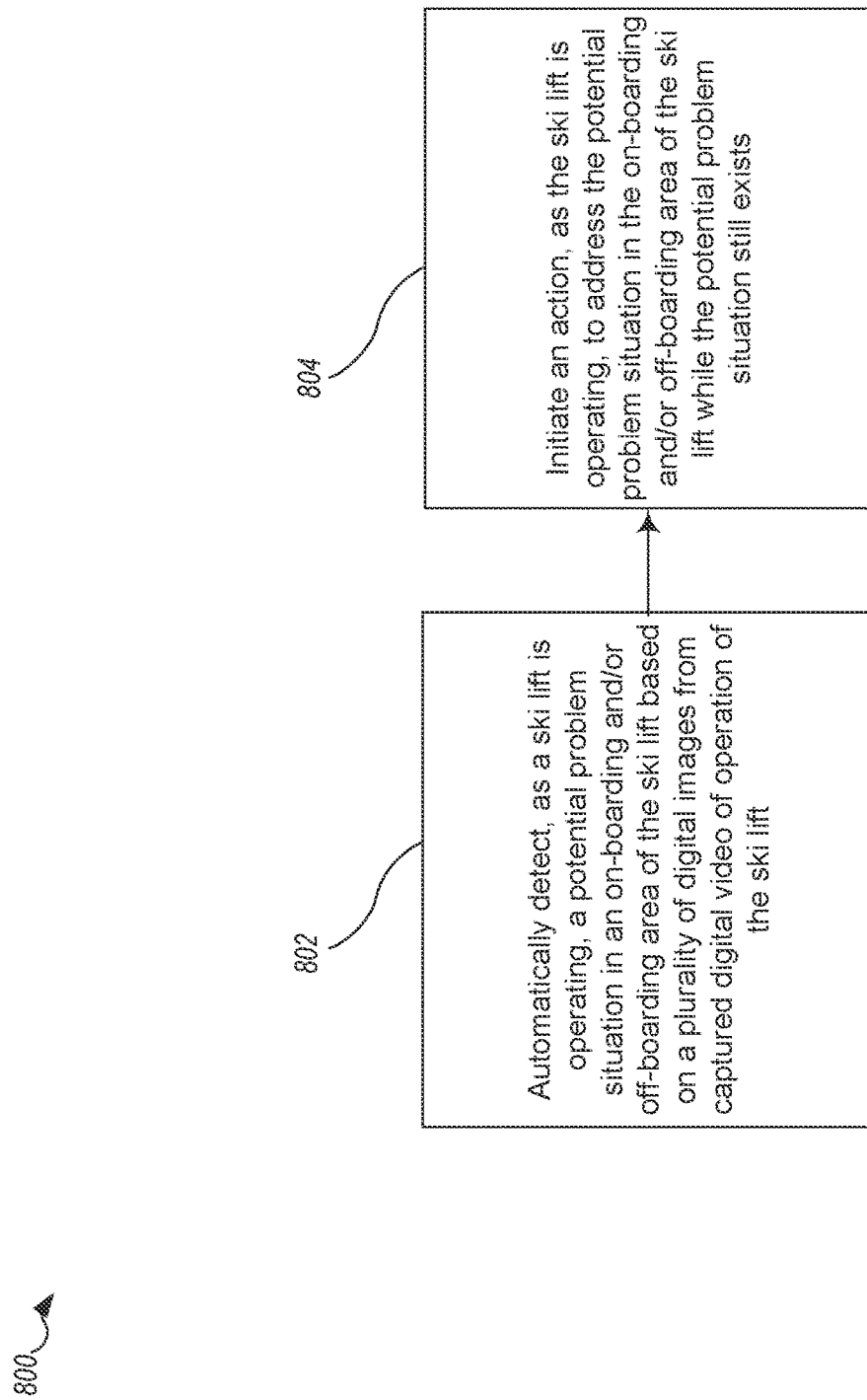
FIG. 8 is a flow diagram of a computerized method for improved ski lift operations, according to another example embodiment.

FIG. 8 is a flow diagram of a computerized method 800 for improved ski lift operations, according to another example embodiment.

At 802, the system automatically detects, as a ski lift is operating, a potential problem situation in one or more of an on-boarding and off-boarding area of the ski lift based on a plurality of digital images from captured digital video of operation of the ski lift. A sequence of events that represents an abnormal on-boarding or off-boarding process that may be indicative of potential problem situation includes, but is not limited to, one or more of: a lift rider falling while on-boarding the ski lift; a lift rider falling while off-boarding the ski lift; a lift rider lying or sitting the ground in a lift chair loading zone; a lift rider being dragged by a ski lift chair; a ski pole or other equipment of a lift rider being caught in a ski lift chair; a lift rider proceeding to on-board the ski lift late; a lift rider failing to exit off-boarding area; a lift rider being in an abnormal position on a lift chair after on-boarding the ski lift; a lift rider starting to slip off a lift chair after on-boarding the ski lift; a lift rider leaving a lift chair loading zone as a lift chair is approaching the lift rider; a lift rider under a pre-determined size in a lift chair loading zone as a lift chair is approaching the lift rider; a number of lift riders being in a lift chair loading zone that is over a pre-determined limit of lift riders for a lift chair; a lift rider facing a wrong direction in a lift chair loading zone as the lift chair is approaching the lift rider; a lift rider being in an incorrect position within a lift chair loading zone as the lift chair is approaching the lift rider; an incorrect number of lift riders off-boarding a lift chair compared to a number of lift riders that on-boarded the lift chair; an incorrect number of lift riders on a lift chair compared to a number of lift riders that were in a lift chair loading zone for the lift chair when the lift chair arrived for on-boarding; a mechanical problem with a lift chair of the ski lift; a mechanical problem with operation of the ski lift; and a problem with a structural element of the ski lift.

At 804, the system initiates an action, as the ski lift is operating, to address the potential problem situation in the one or more of the on-boarding and off-boarding area of the ski lift while the potential problem situation still exists.

While various embodiments have been described herein above, it is to be appreciated that various changes in form and detail may be made without departing from the spirit and scope of the invention(s) presently or hereafter claimed.

The invention claimed is:

1. A computerized method for improved ski lift operations, comprising:
   capturing, by at least one computer processor, digital video of one or more of on-boarding and off-boarding operations of a ski lift;
   generating, by at least one computer processor, as the ski lift is operating, a plurality of digital images of the one or more of on-boarding and off-boarding operations of the ski lift based on the captured digital video, wherein the plurality of digital images includes sequences of video frames, wherein each sequence of the sequences of video frames includes a plurality of individual video frames representing a sequence of events;
   automatically detecting, by at least one computer processor, in real-time as the digital video is being captured, as the ski lift is operating, a potential problem situation represented by an abnormal position of a lift rider while on-boarding or off-boarding the ski lift in one or more of an on-boarding area and an off-boarding area of the ski lift based on the plurality of digital images, wherein the automatically detecting the potential problem situation includes:

analyzing the plurality of digital images as the ski lift is operating, including recognizing in the plurality of digital images a sequence of events that represents the abnormal position of a lift rider resulting in an abnormal on-boarding or off-boarding process at a scene of the ski lift that includes the one or more of an on-boarding area and an off-boarding area of the ski lift; and determining, based on a combined sequence of video frames of at least one of the sequences of video frames, whether a sequence of events represented by the at least one of the sequences of video frames indicates a problem situation represented by an abnormal position of a lift rider while on-boarding or off-boarding the ski lift, wherein the sequence of events that represents the abnormal position of a lift rider resulting in the abnormal on-boarding or off-boarding process includes a lift rider starting to slip off a lift chair after on-boarding the ski lift; and initiating an action, by the at least one computer processor, as the ski lift is operating, to address the potential problem situation in the one or more of an on-boarding area and off-boarding area of the ski lift while the potential problem situation still exists.

2. The method of claim 1 further comprising:

analyzing, by at least one computer processor, the plurality of digital images as the ski lift is operating, wherein the automatically detecting the potential problem situation is based on the analysis of the plurality of digital images.

3. The method of claim 1 wherein the sequence of events that represents the abnormal position of the lift rider resulting in the abnormal on-boarding or off-boarding process includes a lift rider falling while on-boarding the ski lift.

4. The method of claim 1 wherein the analyzing the plurality of digital images as the ski lift is operating, includes:

analyzing the plurality of digital images using an artificial intelligence engine trained to assess sequences of digital images and identify normal positions of the lift rider and potential problem situations taking place in a scene of the ski lift represented by abnormal positions of the lift rider that includes the one or more of an on-boarding area and an off-boarding area of the ski lift.

5. The method of claim 4 further comprising:

training the artificial intelligence engine, using sequences of training images of one or more of on-boarding and off-boarding operations of one or more ski lifts, to assess the sequences of digital images and identify normal positions of the lift rider and potential problem situations taking place in the scene represented by abnormal positions of the lift rider.

6. The method of claim 1 wherein initiating the action to address the potential problem situation in the one or more of the on-boarding and off-boarding area of the ski lift while the potential problem situation still exists includes:

comparing the detected potential problem situation represented by an abnormal position of a lift rider while on-boarding or off-boarding the ski lift to a plurality of potential problem situations to determine a match of the detected potential problem situation to a matching one of the plurality of potential problem situations;

selecting an action to initiate according to a rule associated with the matching one of the plurality of potential problem situations; and initiating the selected action to address the potential problem situation in the one or more of the on-boarding and off-boarding area of the ski lift while the potential problem situation still exists.

7. The method of claim 1 wherein the initiating the action to address the potential problem situation in the one or more of the on-boarding and off-boarding area of the ski lift while the potential problem situation still exists includes initiating electronic sending of a signal to a motor controller of the ski lift to slow down or stop operation of the ski lift to address the potential problem situation in the one or more of the on-boarding and off-boarding area of the ski lift.

8. The method of claim 1 wherein the initiating the action to address the potential problem situation in the one or more of the on-boarding and off-boarding area of the ski lift while the potential problem situation still exists includes initiating of electronic sending of an alert for a ski lift attendant.

9. The method of claim 1 wherein the sending the alert for the ski lift attendant includes one or more of: sending an audio alert, sending a message-based alert and sending a light-based alert.

10. A system for improved operations of ski lifts, comprising:

at least one memory; and at least one processor coupled to the at least one memory, wherein the at least one memory has computer-executable instructions stored thereon that, when executed, cause the at least one processor to:

capture digital video of one or more of on-boarding and off-boarding operations of a ski lift;

generate, as the ski lift is operating, a plurality of digital images of the one or more of on-boarding and off-boarding operations of the ski lift based on the captured digital video;

automatically detect, as the ski lift is operating, a potential problem situation represented by an abnormal position of a lift rider while on-boarding or off-boarding the ski lift in one or more of the on-boarding and off-boarding area of the ski lift based on the plurality of digital images, wherein the automatically detecting the potential problem situation includes analyzing the plurality of digital images as the ski lift is operating, including recognizing in the plurality of digital images a sequence of events that represents the abnormal position of a lift rider resulting in an abnormal on-boarding or off-boarding process at a scene of the ski lift that includes the one or more of an on-boarding area and an off-boarding area of the ski lift, wherein the sequence of events that represents the abnormal position of a lift rider resulting in the abnormal on-boarding or off-boarding process includes a lift rider starting to slip off a lift chair after on-boarding the ski lift; and initiate an action, as the ski lift is operating, to address the potential problem situation in the one or more of the on-boarding and off-boarding area of the ski lift while the potential problem situation still exists.

11. A ski lift controller comprising:

a ski lift motor controller of a ski lift;

at least one memory;

at least one video camera; and at least one processor coupled to the at least one memory, the at least one camera and the ski lift motor controller, wherein the at least one memory has computer-executable instructions stored thereon that, when executed, cause the at least one processor to:

capture, via the at least one video camera, digital video of one or more of on-boarding and off-boarding operations of the ski lift;

generate, as the ski lift is operating, a plurality of digital images of the one or more of on-boarding and off-boarding operations of the ski lift based on the captured digital video;

automatically detect, as the ski lift is operating, a potential problem situation in one or more of the on-boarding and off-boarding area of the ski lift represented by an abnormal position of a lift rider while on-boarding or off-boarding the ski lift based on the plurality of digital images, wherein the automatically detecting the potential problem situation includes analyzing the plurality of digital images as the ski lift is operating, including recognizing in the plurality of digital images a sequence of events that represents the abnormal position of a lift rider resulting in an abnormal on-boarding or off-boarding process at a scene of the ski lift that includes the one or more of an on-boarding area and an off-boarding area of the ski lift, wherein the sequence of events that represents the abnormal position of a lift rider resulting in the abnormal on-boarding or off-boarding process includes a lift rider starting to slip off a lift chair after on-boarding the ski lift; and initiate an action, as the ski lift is operating, to address the potential problem situation in the one or more of the on-boarding and off-boarding area of the ski lift while the potential problem situation still exists.

12. A non-transitory computer-readable storage medium, having computer executable instructions stored thereon that, when executed by the at least one processor, cause the at least one processor to:

automatically detect, as a ski lift is operating, a potential problem situation in one or more of an on-boarding and off-boarding area of the ski lift represented by an abnormal position of a lift rider while on-boarding or off-boarding the ski lift based on a plurality of digital images from captured digital video of operation of the ski lift, wherein the automatically detecting the potential problem situation includes analyzing the plurality of digital images as the ski lift is operating, including recognizing in the plurality of digital images a sequence of events that represents the abnormal position of a lift rider resulting in an abnormal on-boarding or off-boarding process at a scene of the ski lift that includes the one or more of an on-boarding area and an off-boarding area of the ski lift, wherein the sequence of events that represents the abnormal position of a lift rider resulting in the abnormal on-boarding or off-boarding process includes a lift rider starting to slip off a lift chair after on-boarding the ski lift; and initiate an action, as the ski lift is operating, to address the potential problem situation in the one or more of the on-boarding and off-boarding area of the ski lift while the potential problem situation still exists.

13. The non-transitory computer-readable storage medium of claim 12, wherein the computer executable instructions, when executed, further cause the at least one processor to:

capture digital video of the one or more of on-boarding and off-boarding operations of a ski lift; and generate, as the ski lift is operating, the plurality of digital images of the one or more of on-boarding and off-boarding operations of the ski lift based on the captured digital video.

14. The method of claim 1 wherein the automatically detecting in real-time as the digital video is being captured, as the ski lift is operating, the potential problem situation represented by the abnormal position of the lift rider in one or more of the on-boarding area and an off-boarding area of the ski lift based on the plurality of digital images includes automatically detecting in real-time as the digital video is being captured, as the ski lift is operating, the potential problem situation in the one or more of an on-boarding area and an off-boarding area of the ski lift before boarding of the ski lift by the lift rider.

15. The method of claim 1 wherein the automatically detecting in real-time as the digital video is being captured, as the ski lift is operating, the potential problem situation represented by the abnormal position of the lift rider in the one or more of an on-boarding area and an off-boarding area of the ski lift based on the plurality of digital images includes automatically detecting in real-time as the digital video is being captured, as the ski lift is operating, the potential problem situation in an off-boarding area of the ski lift.

16. The method of claim 1 wherein the sequence of events that represents the abnormal position of a lift rider resulting in the abnormal on-boarding or off-boarding process includes a lift rider falling while off-boarding the ski lift.

17. The method of claim 1 wherein the sequence of events that represents the abnormal position of a lift rider resulting in the abnormal on-boarding or off-boarding process includes a lift rider lying or sitting on the ground in a lift chair loading zone.

18. The method of claim 1 wherein the sequence of events that represents the abnormal position of a lift rider resulting in the abnormal on-boarding or off-boarding process includes a lift rider being dragged by a ski lift chair.

19. The method of claim 1 wherein the sequence of events that represents the abnormal position of a lift rider resulting in the abnormal on-boarding or off-boarding process includes a ski pole or other equipment of a lift rider being caught in or under a ski lift chair.

20. The method of claim 1 wherein the sequence of events that represents the abnormal position of a lift rider resulting in the abnormal on-boarding or off-boarding process includes a lift rider proceeding to on-board the ski lift late.

21. The method of claim 1 wherein the sequence of events that represents an abnormal position of a lift rider resulting in the abnormal on-boarding or off-boarding process includes a lift rider leaving a lift chair loading zone as a lift chair is approaching the lift rider.

22. The method of claim 1 wherein the sequence of events that represents the abnormal position of a lift rider resulting in the abnormal on-boarding or off-boarding process includes a lift rider being in an incorrect position within a lift chair loading zone as the lift chair is approaching the lift rider.

23. The method of claim 1 wherein the determining, based on a combined sequence of video frames of at least one of the sequences of video frames, whether a sequence of events represented by the at least one of the sequences of video frames indicates a problem situation represented by an abnormal position of a lift rider while on-boarding or off-boarding the ski lift includes examining the combined sequence of video frames such that a given frame of the combined sequence of video frames is seen, by the at least one processor, in context of the previous frames of the combined sequence of video frames.

24. The method of claim 1 wherein the determining, based on a combined sequence of video frames of at least one of the sequences of video frames, whether a sequence of events represented by the at least one of the sequences of video frames indicates a problem situation represented by an abnormal position of a lift rider while on-boarding or off-boarding the ski lift includes classifying the combined sequence of video frames as representing a problem situation, and further comprising:

determining, by the at least one processor, that the at least one of the sequences of video frames indicates a problem situation based on the classification of the combined sequence of video frames as representing the problem situation.

25. The method of claim 1 wherein the determining, based on a combined sequence of video frames of at least one of the sequences of video frames, whether a sequence of events represented by the at least one of the sequences of video frames indicates a problem situation represented by an abnormal position of a lift rider while on-boarding or off-boarding the ski lift includes:

before generating the plurality of digital images of the one or more of on-boarding and off-boarding operations:

training an AI model with normal on-boarding or off-boarding training sequences of video frames, wherein a combination of video frames comprising each normal on-boarding or off-boarding training sequence represents a corresponding normal position of a lift rider while on-boarding or off-boarding the ski lift by indicating to the AI model that, for each normal on-boarding or off-boarding training sequence of video frames, the combination of video frames comprising the normal on-boarding or off-boarding training sequence represents a normal position of a lift rider while on-boarding or off-boarding the ski lift; and training the AI model with abnormal on-boarding or off-boarding training sequences of video frames, wherein a combination of video frames comprising each abnormal on-boarding or off-boarding training sequence represents a corresponding abnormal position of a lift rider while on-boarding or off-boarding the ski lift by indicating to the AI model that, for each abnormal on-boarding or off-boarding training sequence of video frames, the combination of video frames comprising the abnormal on-boarding or off-boarding training sequence; and represents an abnormal position of a lift rider while on-boarding or off-boarding the ski lift; and determining, using the AI model trained with the normal on-boarding or off-boarding training sequences of video frames and with the abnormal on-boarding or off-boarding training sequences of video frames, based on the combined sequence of video frames of the at least one of the sequences of video frames included in the generated plurality of digital images of the one or more of on-boarding and off-boarding operations, whether the at least one of the sequences of video frames included in the generated plurality of digital images of the one or more of on-boarding and off-boarding operations represents an event that indicates a problem situation represented by an abnormal position of a lift rider while on-boarding or off-boarding the ski lift.

26. The method of claim 25 wherein the determining whether the at least one of the sequences of video frames included in the generated plurality of digital images of the one or more of on-boarding and off-boarding operations represents an event that indicates a problem situation represented by an abnormal position of a lift rider while on-boarding or off-boarding the ski lift includes detection of movement of the lift rider represented by the at least one of the sequences of video frames while on-boarding or off-boarding the ski lift.

27. The method of claim 1 wherein the potential problem situation is represented by an abnormal position of a plurality of lift riders while on-boarding or off-boarding the ski lift based on detected states of the plurality of lift riders.

28. The method of claim 25 wherein the combination of video frames comprising each normal on-boarding or off-boarding training sequence represents a corresponding normal position of a plurality of lift riders while on-boarding or off-boarding the ski lift based on detected states of the plurality of lift riders.

\* \* \* \* \*